B. F. Sturtevant,

Air Blast.

No. 100,242.    Patented Feb. 22, 1870.

UNITED STATES PATENT OFFICE.

B. F. STURTEVANT, OF JAMAICA PLAIN, MASSACHUSETTS.

Letters Patent No. 100,242, dated February 22, 1870.

IMPROVEMENT IN COMPOUND AIR-HEATERS AND STEAM-CONDENSERS.

The Schedule referred to in these Letters Patent and making part of the same.

*To all whom it may concern:*

Be it known that I, B. F. STURTEVANT, of Jamaica Plain, in the county of Norfolk, and State of Massachusetts, have invented Improvements in Air-Surface Condensers; and I do hereby declare that the following, taken in connection with the drawings which accompany and form part of this specification, is a description of my invention sufficient to enable those skilled in the art to practice it.

In that class of apparatus in which currents of air are forced or drawn by the action of a rotary blower through a series of tubes contained in a case, into which tubes steam is introduced, so as to give up its heat by conduction through the material of thin tubes to the air currents passing through their bores, it is an object of practical importance to so connect the blower with the condenser that the said two parts can be removably attached, with respect to each other, so that they shall be capable of easy dismemberment for repairs, cleaning, and transportation, and one part of my present invention relates to such a construction.

Another part relates to such a construction as converts the outside of the tube-case, into which steam is introduced into radiating surface, by which the area of the condensing surface is increased, as a current of air is made to pass around the tube-case, and between it and an outer casing, which confines the air acted on by the blower.

And another part of my invention relates to the introduction into the steam-passages of deflectors to break the force of incoming water.

Figure 1:
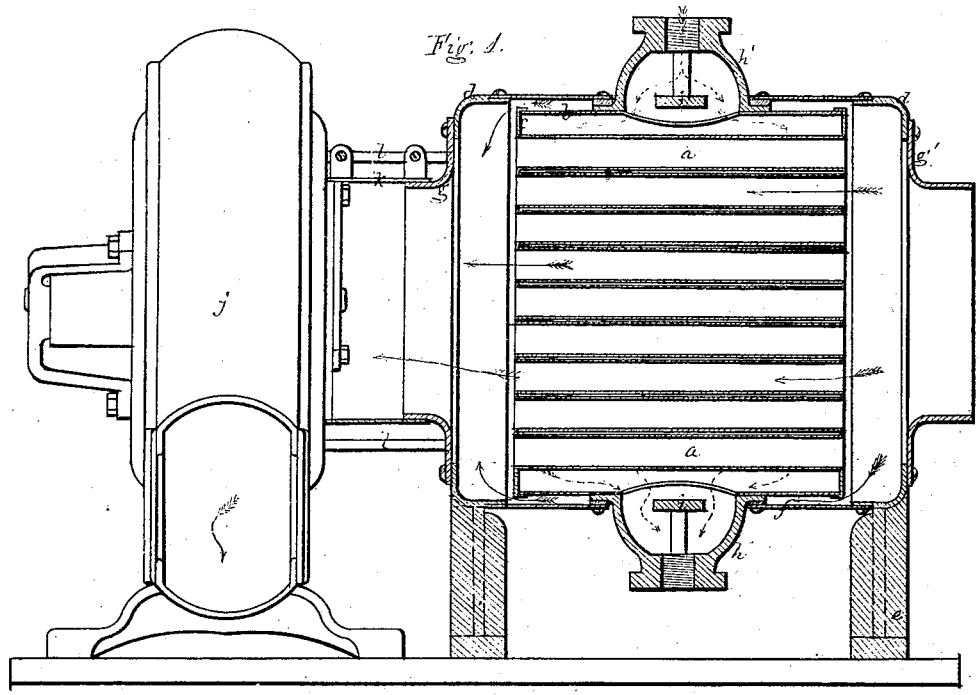
Figure 2:
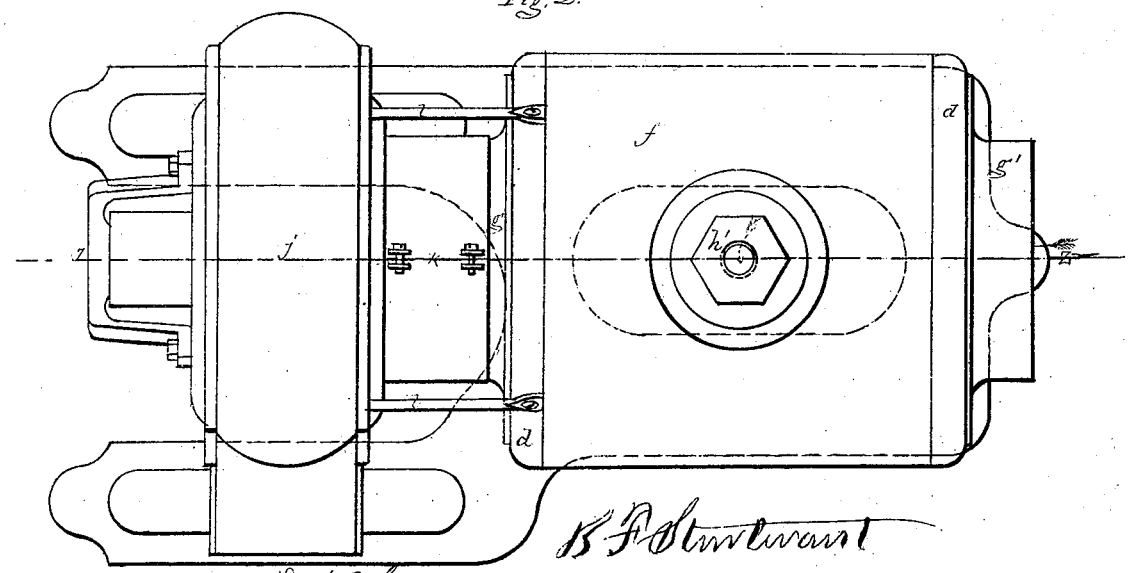

Figure 1 of the drawings shows in sectional elevation an apparatus embodying my invention, the section being taken in the plane of the line z z, seen in Figure 2, which is a plan of my said apparatus.

The case, which contains the tubes $a\ a$, is made up of a cylinder, $b$, and two tube-sheets or heads, $c\ c$, and said case is contained in an outer case, made up of rings $d$, (having feet $e$, which are designed to be bolted to a foundation,) cylinder $f$, made in two or more parts, and tunnel-shaped heads $g\ g'$.

On the part $b$ of the steam-case are bolted nozzles, $h\ h'$, which project through openings made in the cylinder $f$, the flanges of the nozzles on cylinder $b$ filling the distance from $b$ to $f$, thus supporting the tubular case concentrically within the cylinder $f$, which gives an air passage all around the periphery of the tubular case, and allows it to expand and contract freely.

In the nozzles $h\ h'$ are fixed deflecting-plates $i$, directly across the inlet and outlet steam-passages, so as to deflect and spread the steam currents to cause them to fill the entire space within the tubular drum, around the outside of the tubes, instead of rushing directly through said space from nozzle to nozzle by the shortest and most direct passage.

The direction of the steam-currents is shown by the dotted arrows marked in fig. 1.

The outer cylinder $f$ is removably attached to the nozzle flanges and to the rings $d$ by means of screws, and the heads $g$ and $g'$ are removably attached to the rings $d$ by means of screws.

The blower $j$ is of a kind well known, and described in Letters Patent of the United States granted to me. It is located at some distance from the head $g$ of the condenser, so as to give room between the blower and condenser for any needed operations of a workman or attendant upon the blower shaft-bearings, or upon the tube ends.

The air-passage between the blower and condenser is made by an encompassing band, $k$, of metal, the parts of which are secured together by screws, so that said band forms an easily removable ring, which fits upon the neck of head $g$, and a ring formed on the side of the blower.

For small apparatus I prefer to connect the blower and condenser by attaching them to a common foundation or bed-plate to keep them in proper position relatively to each other; but in large apparatus I use by preference the stay-rods $l$, dispensing with the bed-plate as being then unnecessary, as permanent foundations are made to receive the weight and stress of the apparatus, and the stay-rods then only act to prevent the top of the blower from swaying, and to determine the relative position of the parts before they are fixed to a local permanent foundation.

I have heretofore connected the tube-case directly to one side of the blower, but the arrangement of the said parts at some distance apart, and connecting them with a removable passage-way, $k$, enables me to keep one of the blower shaft-bearings and the tube ends adjacent thereto, in repair without changing the relative positions of the blower and the tube-case, and thus I save when such operations are required, disconnecting the steam-pipes and one of the air-conveying pipes.

Though the blower is shown in the drawings as arranged to draw air through the tubes $a$, it will be obvious that it might be so arranged and operated as to force air through said tubes under my invention herein set forth.

I claim—

The arrangement of the tube-case $b$ within an air-case, $f$, so that the air will pass around the tube-case, as well as through the tubes, substantially as and for the purpose specified.

Also, the tube-case, attached to and supported by the air-case by connections located at points reinforced by the castings between the ends of the tube-case, so as to leave the tube-case free to expand and contract under thermal changes.

Also, the air-case extension, constructed in removably attached parts $k$ and $g$, to afford easy access to the tube-case, substantially as described.

Also, a tube-case in the steam-passages of which on the periphery are arranged deflectors $i$, substantially as and for the purpose specified.

Also, the arrangement of the blower and tube-case separated from each other a fixed distance and having between them the removably attached air-pipe, substantially as described.

B. F. STURTEVANT.

Witnesses:
 J. B. CROSBY,
 FRANCIS GOULD.